United States Patent [19]
Loyd et al.

[11] Patent Number: 5,193,524
[45] Date of Patent: Mar. 16, 1993

[54] OVERFLOW COOKING POT ASSEMBLY

[76] Inventors: Dennis G. Loyd; Lois B. Loyd, both of R.R. #1, Box 97, Downs, Kans. 67437

[21] Appl. No.: 787,377

[22] Filed: Nov. 4, 1991

[51] Int. Cl.$^5$ .............................................. F24H 7/00
[52] U.S. Cl. .................................... 126/389; 126/384; 126/386; 220/336; 220/208
[58] Field of Search ............... 126/384, 383, 385, 386, 126/357, 373, 389; 220/202, 203, 374, 208, 244, 340, 360, 366, 368, 375; 99/331, 413, 446, 467, 468

[56] References Cited
U.S. PATENT DOCUMENTS

| | | | |
|---|---|---|---|
| 181,396 | 8/1876 | Bevin | 126/386 |
| 832,274 | 10/1906 | Probst | 126/389 |
| 1,160,934 | 11/1915 | Meyer | 220/336 X |
| 1,371,718 | 3/1921 | Zimmermann | 126/386 |
| 1,766,797 | 6/1930 | Nakagawa | 126/385 |
| 2,845,059 | 7/1958 | Kellcher | 126/386 |
| 3,797,694 | 3/1974 | See et al. | 220/208 |
| 4,485,801 | 12/1984 | Hodges et al. | 126/386 |
| 5,033,453 | 7/1991 | Loyd et al. | 126/373 X |

Primary Examiner—Larry Jones
Attorney, Agent, or Firm—Phillip A. Rein

[57] ABSTRACT

The invention is an overflow cooking pot assembly having 1) a main support pan member; 2) a main trip lid assembly mounted on the main support pan member; and 3) an outer lid assembly mounted on the main support pan member and enclosing the main trip lid assembly. The main support pan member is provided with a main support section with an upper, outer arcuate fluid overflow section so as to retain any overflow fluids that might escape from containment or automatic pressure release of the main trip lid assembly. The main trip lid assembly is provided with 1) a trip lid housing assembly; 2) a lid support and actuator assembly; 3) a lid release adjustment assembly; 4) an actuator ball assembly; and 5) a restraining assembly. The main trip lid assembly is operable to 1) automatically release on excessive adjustable cooking pressure build-up within the main support pan member; 2) be placed through the lid support and actuator assembly in an inactive or non-release pressurized condition; and 3) be held in a limited tripped, inclined, released position by the restraining assembly. A second embodiment involves an overflow cooking pot and adapter assembly which is usable with a conventional support pan member and having a fluid overflow adapter assembly utilized with the main trip lid assembly identical to the first embodiment. A third embodiment allows the fluid overflow adapter assembly and interconnected main trip lid assembly to be utilized with a concave support pan member.

32 Claims, 4 Drawing Sheets

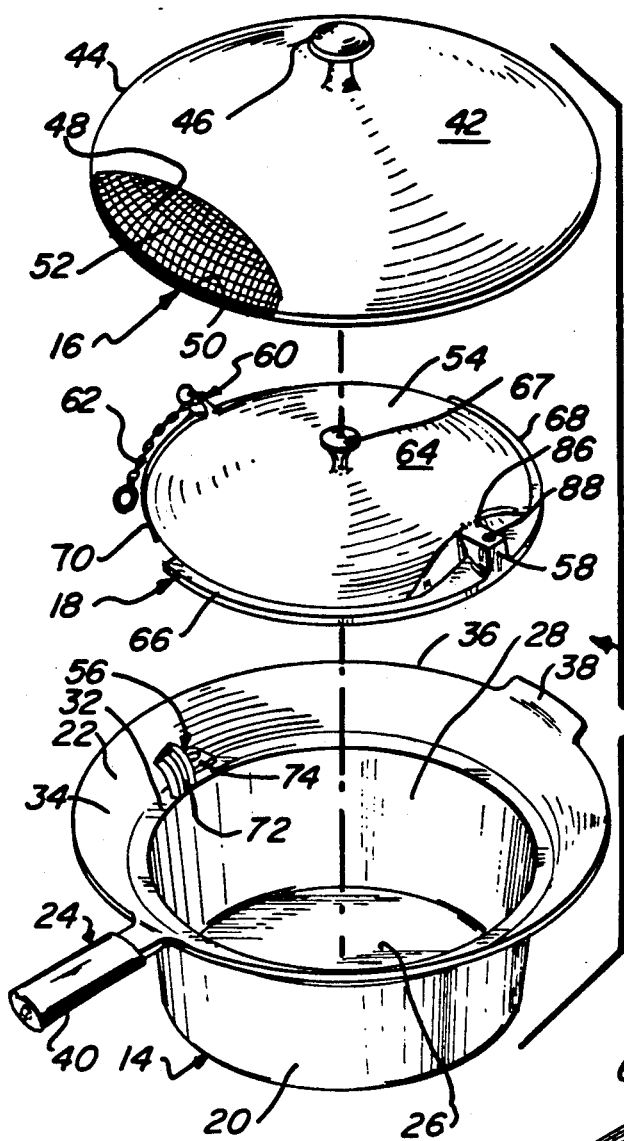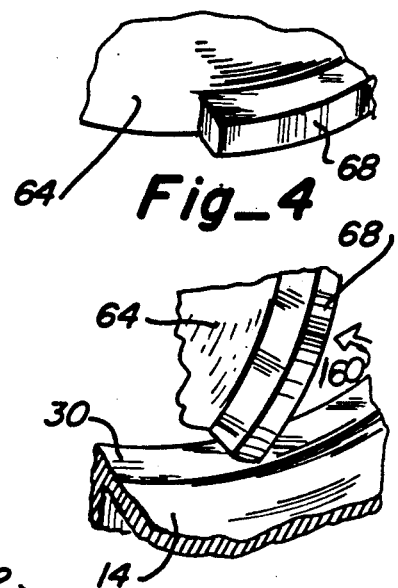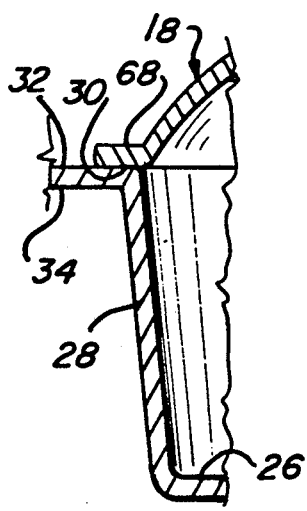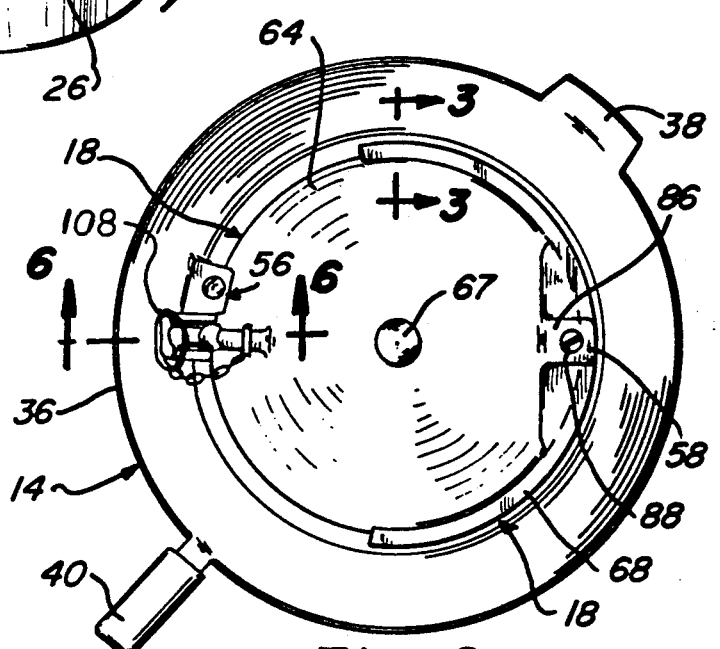

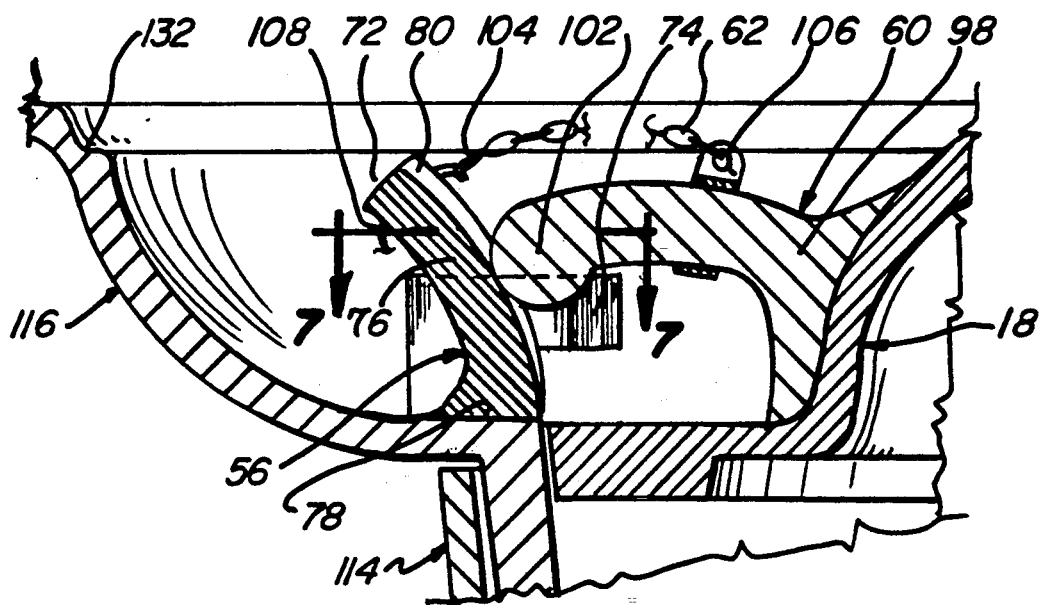
Fig_6
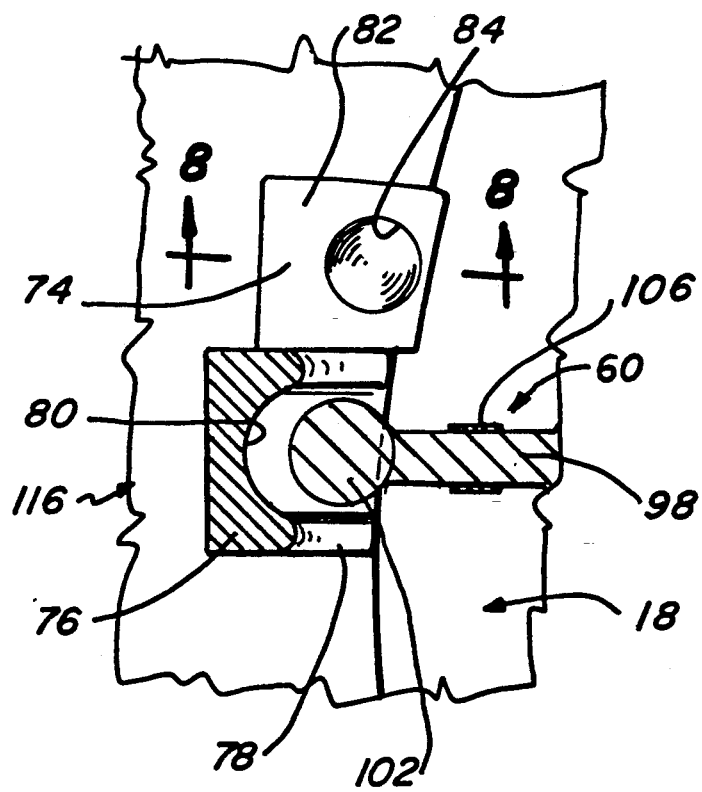
Fig_7

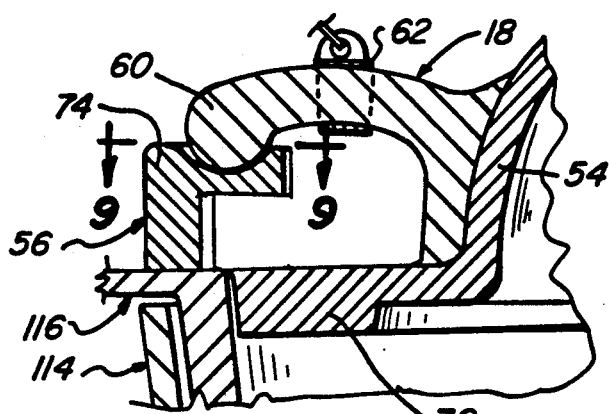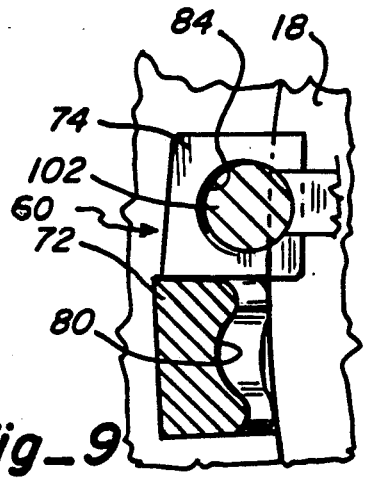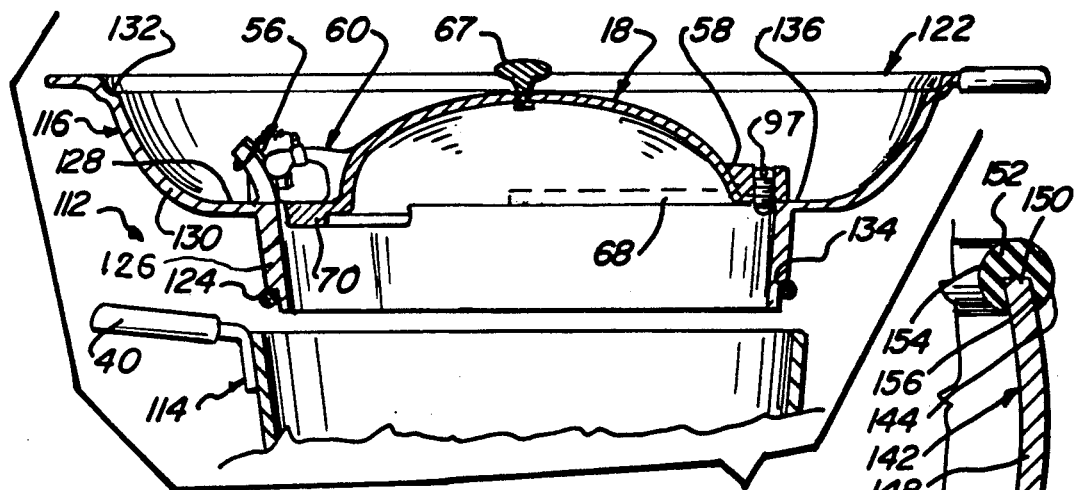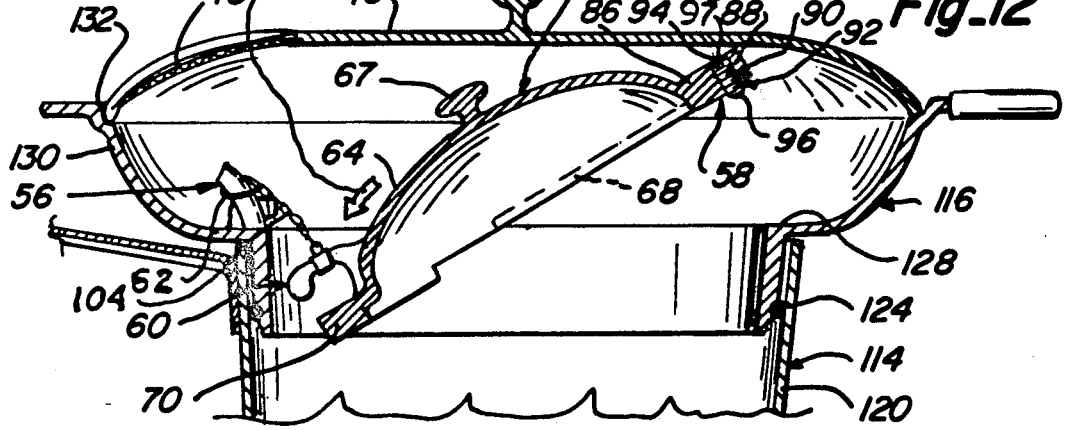

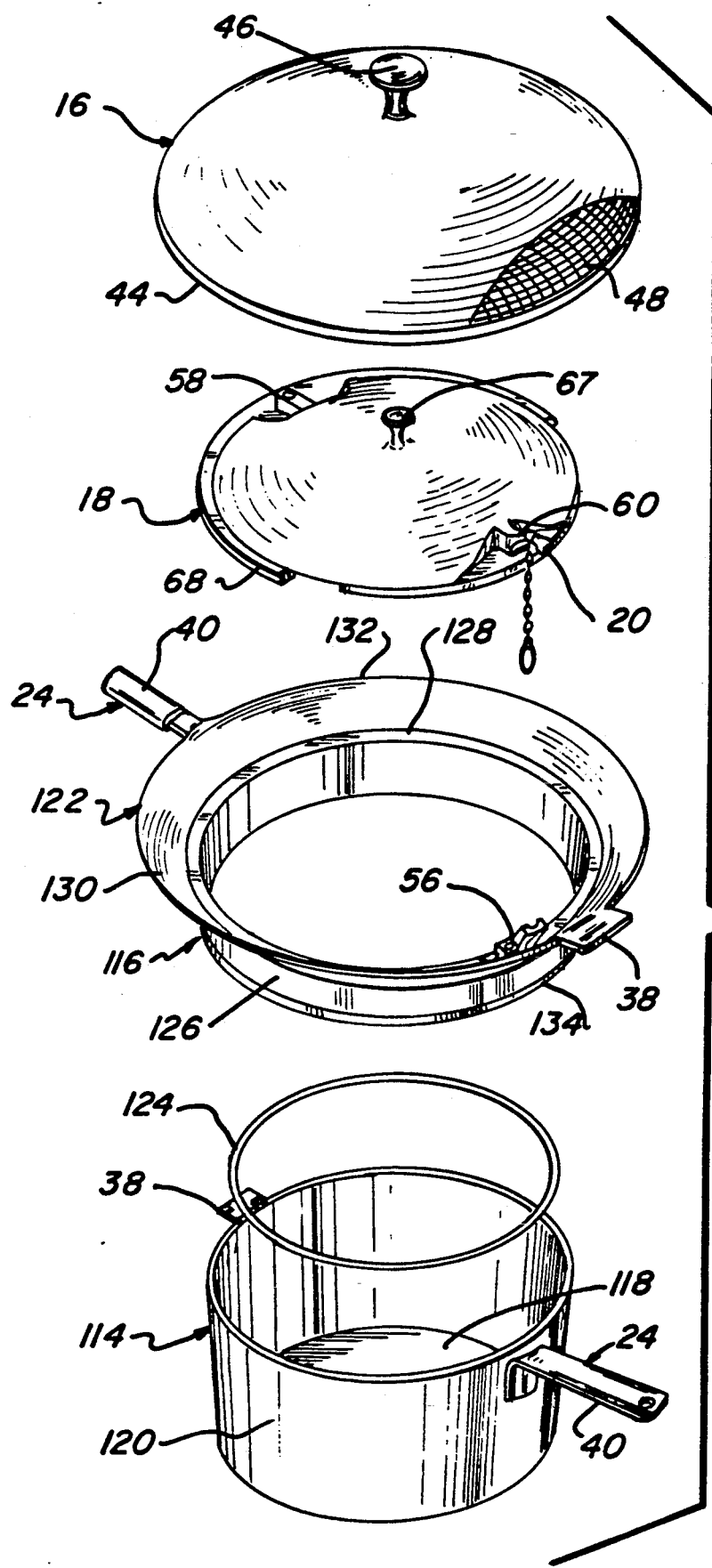
Fig_13

OVERFLOW COOKING POT ASSEMBLY

PRIOR ART

A United States patent search was not conducted on this invention but the joint inventors herein have obtained a U.S. Pat. No. 5,033,453, issued Jul. 23, 1991, entitled "Overflow Cooking Pot Assembly".

PREFERRED EMBODIMENT OF THE INVENTION

In one preferred embodiment of this invention, an overflow cooking pot assembly or overflow cooking pot assembly with automatic trip lid assembly and universal pan adapter includes 1) main support pan member; 2) an outer lid assembly mounted on the main support pan member; and 3) a main trip lid assembly mountable on the main support pan member and selectively covered by the outer lid assembly.

The main support pan member includes 1) a main support section having a fluid overflow section integral therewith; and 2) a handle assembly secured to upper portions of the main support section.

The main support section resembles a standard pan member having a bottom wall with upwardly and outwardly inclined side walls and secured through a lid support rim portion to a fluid overflow section. The fluid overflow section is of a generally arcuate shape, extended horizontally, then upwardly and outwardly from the lid support rim portion.

The handle assembly includes a finger handle member secured on an upper edge of the fluid overflow section and, directly opposed thereto, is a lateral handle member for ease of grasping and conveying the entire main support pan member.

The outer lid assembly includes a main arcuate body member having an outer seal lip section and a grasp knob member mounted on an upper central portion of the main arcuate body member.

The main arcuate body member is provided with a drainage opening which is covered by a screen member so that the outer lid assembly can be held against the fluid overflow section of the main support pan member for tipping to allow drainage of fluids therefrom without losing the food product contained therein and, therefore, acts as a combination lid member and strainer.

The main trip lid assembly includes 1) a trip lid housing assembly; 2) a lid support and actuator assembly connected to the lid support rim portion of the main support pan member; 3) a lid release adjustment assembly connected to the trip lid housing assembly; 4) an actuator ball assembly secured to the trip lid housing assembly; and 5) a restraining assembly connected to the actuator ball assembly and releasably connectable to the lid support and actuator assembly to limit pivotal movement of the main trip lid assembly.

The trip lid housing assembly includes a main arcuate housing body integral with an actuator rim assembly and a knob member mounted in a central upper portion of the main arcuate housing body.

the actuator rim assembly includes a projecting support section along one edge thereof and opposite thereto is a weighted support section.

The lid support and actuator assembly includes a trip slide member with an adjacent trip stabilizer member, both of which are attached to one edge of the main arcuate housing body and operable to engage the actuator ball during usage.

The trip slide member includes a main slide body having an anchor section and an arcuate circular ball support section which is inclined downwardly towards the bottom wall of the main support pan member.

The trip stabilizer member includes a ball support plate having a semi-circular indentation therein to receive a portion of the actuator ball assembly when placed in an inactive, non-release pressurized condition.

The lid release adjustment assembly includes a release support member having a threaded hole therein to receive an adjustment screw member having an outer hemispherical end section. The adjustment screw member is selectively movable axially within the threaded hole to adjust pressure releasing features of the main trip lid assembly.

The actuator ball assembly includes a ball support member secured to a top surface of the main arcuate housing body of the trip lid housing assembly and extended outwardly therefrom having a ball member mounted thereon.

The ball member is operable to engage the trip slide member within the circular ball support section for proper operation thereof during a trip release function of the main trip lid assembly and positioned diametrically opposite the lid release adjustment assembly.

The restraining assembly includes a chain member having one end connected by an anchor clamp member to the ball support member and, at an opposite end, is secured to a circular ring member.

The ring member is operable to be placed about the main slide body so as to limit the pivotal movement of the main trip lid assembly when in a pressure released condition.

A second embodiment of the overflow cooking pot assembly is an overflow cooking pot and adapter assembly utilizing a conventional support pan member and having a fluid overflow adapter assembly mounted on the support pan member plus the previously described main trip lid assembly used therewith.

The fluid overflow adapter assembly includes an overflow rim assembly used with an O-ring member operable to be placed within an inner, upwardly, outwardly inclined side wall of the conventional support pan member.

The overflow rim assembly includes an inner tapered wall section integral with a flat horizontal section which, in turn, is integral with an arcuate wall section and having an upper lid support rim section integral therewith.

The fluid overflow adapter assembly is provided with a lid support and actuator assembly as described for the first embodiment which is mounted on the flat horizontal section of the overflow rim assembly.

Additionally, the overflow rim assembly is provided with a handle assembly connected to the upper lid support rim section. The inner tapered wall section is provided on a lower exterior portion thereof with an O-ring groove to receive the O-ring member therein. The O-ring member extends outwardly from the inner tapered wall section so as to engage an inner side wall surface of the conventional support pan member when mounted therein in a sealing manner.

The overflow cooking pot and adapter assembly includes the previously described main trip lid assembly which is operable to be mounted within the overflow rim assembly and cooperates with the flat horizontal section therein for proper operation.

In a third embodiment of the overflow cooking pot assembly, a concave support pan member is used with a support O-ring member connected thereto. The concave support pan member has an arcuate outwardly concave side wall integral with an upper support rim section.

The upper support rim section is adapted to receive the support O-ring member mounted thereon so as to provide a sealing function with the fluid overflow adapter assembly described in the second embodiment, being the overflow cooking pot and adapter assembly.

The support O-ring member would then seal with an outer surface of the inner tapered wall section of the fluid overflow adapter assembly. This permits operation with the outwardly concave support pan member which would not be possible without the third embodiment of this invention.

OBJECTS OF THE INVENTION

One object of this invention is to provide an overflow cooking pot assembly having a main trip lid assembly mounted on a main support pan member with the main trip lid assembly being automatically movable to a trip lid released condition on a certain amount of steam pressure created within the main support pan member.

Another object of this invention is to provide an overflow cooking pot assembly including a main trip lid assembly mountable on a main support pan member with the main trip lid assembly having 1) a lid support and actuator assembly connected to the main support pan member; and 2) a trip lid housing assembly having a actuator ball assembly engagable with the lid support and actuator assembly in a manner so as to be released therefrom if a predetermined amount of pressure is created within the main support pan member.

One other object of this invention is to provide an overflow cooking pot assembly having a lid release adjustment assembly engagable with a portion of a main support pan member and being selectively adjusted to determine at what pressure created within the main support pan member would cause a main trip lid assembly to pivot and release pressure from within the main support pan member to achieve an immediate cooling influence on the boiling contents of the main support pan member.

Still, another object of this invention is to provide an overflow cooking pot assembly including a main support pan member with a main trip lid assembly mounted thereon with the main trip lid assembly operable to move from an enclosed position over the main support pan member to a pivoted, released condition on reaching a predetermined pressure within the main support pan member and having a restraining assembly to limit the released, pivotal movement of the main trip lid assembly.

One other object of this invention is to provide an overflow cooking pot assembly having 1) a main support pan member; 2) a main trip lid assembly mounted on said main support pan member; and 3) an outer lid assembly mounted on the main support pan member enclosing the main trip lid assembly and having thereon a drainage opening covered by a screen member to allow draining of the main support pan member without losing any cooked food product within the main support pan member.

Another object of this invention is to provide an overflow cooking pot assembly including a main trip lid assembly mounted on a main support pan member with means selectively operable to hold the main trip lid assembly in a non-release pressurized condition to operate as a conventional cooking pan and lid assembly.

A further object of this invention is to provide an overflow cooking pot and adapter assembly having a fluid overflow adapter assembly which is operable to be connected to a conventional support pan member through O-rings of selected various sizes so as to utilize a main trip lid assembly therewith without requiring a specially designed support pan member.

One further object of this invention is to provide an embodiment used with a conventional concave support pan member by mounting a support O-ring member of a pre-selected size on an upper edge thereof which will then be usable with the second embodiment of the overflow cooking pot and adapter assembly whether the support pan member has upwardly, outwardly tapered walls or a concave wall.

Another further object of this invention is to provide an overflow cooking pot and adapter assembly which can be used on conventional support pan members having upwardly and outwardly tapered walls or a concave wall to achieve the overall purpose and function of this invention, namely, to automatically release an excessive pressure build-up within a cooking area of the support pan member and achieve immediate cooling of the boiling contents therein.

Still, one further object of this invention is to provide an overflow cooking pot assembly which is economical to manufacture; simple to use; providing an automatic safety feature to release excessive pressure from a main support pan member automatically; providing adjustable features to determine the pressure within the cooking support pan member for a main trip lid assembly to be released; and substantially maintenance free.

Various other objects, advantages, and features of the invention will become apparent to those skilled in the art from the following discussion, taken in conjunction with the accompanying drawings, in which:

FIGURES OF THE INVENTION

FIG. 1 is an exploded perspective view of the overflow cooking pot assembly of this invention;

FIG. 2 is a top plan view of the overflow cooking pot assembly with an outer lid assembly removed therefrom;

FIG. 3 is an enlarged fragmentary sectional view taken along line 3—3 in FIG. 2;

FIG. 4 is a fragmentary perspective view of a portion of a main trip lid assembly of the overflow cooking pot assembly of this invention;

FIG. 5 is a fragmentary perspective view of the main trip lid assembly shown in FIG. 4 in an inclined released condition and mounted on a portion of a main support pan member of the overflow cooking pot assembly of this invention;

FIG. 6 is an enlarged fragmentary sectional view taken long line 6—6 in FIG. 2;

FIG. 7 is a fragmentary sectional view taken along line 7—7 in FIG. 6;

FIG. 8 is a fragmentary sectional view taken along line 8—8 in FIG. 7;

FIG. 9 is a fragmentary sectional view taken along line 9—9 in FIG. 8;

FIG. 10 is an exploded fragmentary sectional view of a second embodiment being a fluid overflow cooking adapter assembly of this invention utilized with a convention support pan member;

FIG. 11 is a fragmentary sectional view of the second embodiment shown in FIG. 10 having an outer lid assembly mounted thereon and a main trip lid assembly indicated in the released condition;

FIG. 12 is a fragmentary vertical sectional view illustrating use of a support O-ring member mounted on and about an upward peripheral edge of a concave pan member to be utilized with the second embodiment of the overflow cooking pot and adapter; and FIG. 13 is an exploded perspective view of the overflow cooking pot and adapter assembly being the second embodiment.

The following is a discussion and description of preferred specific embodiments of the overflow cooking pot assembly of this invention, such being made with reference to the drawings, whereupon the same reference numerals are used to indicate the same or similar parts and/or structure. It is to be understood that such discussion and description is not to unduly limit the scope of the invention.

DESCRIPTION OF THE INVENTION

Referring to the drawings in detail and, in particular to FIG. 1, an overflow cooking pot assembly of this invention, indicated generally at 12, includes 1) a main support pan member 14; 2) an outer lid assembly 16 mounted on the main support pan member 14; and 3) a main trip lid assembly 18 mounted within the main support pan member 14 and operable to be covered by the outer lid assembly 16.

The main support pan member 14 includes a main support section 20 integral with a fluid overflow section 22 and having a handle assembly 24 connected to the fluid overflow section 22.

The main support section 20 is provided with a bottom wall 26 and extended upwardly therefrom is an integral side wall 28. The side wall 28 has an upper flat or horizontal area parallel with the bottom wall 26 being a trip lid support rim portion 30.

The fluid overflow section 22 has a flat horizontal section 32 extended outwardly from the trip lid support rim portion 30 and integral with an arcuate side wall 34. The arcuate side wall 34 has, at an upper edge thereof, a lid support rim portion 36 to support the outer lid assembly 16 thereon.

The handle assembly 24 includes a finger handle member 38 on one side of the lid support rim portion 36 and a lateral handle member 40 diametrically opposed therefrom.

The finger handle member 38 and the lateral handle member 40 are jointly operable for grasping and conveying the entire main support pan member 14.

The outer lid assembly 16 is provided with 1) a main arcuate body member 42 having a peripheral outer seal lip section 44 engagable with the lid support rim portion 36 when mounted on the main support pan member 14; 2) a grasp knob member 46 positioned centrally of an upper, outer portion of the main arcuate body member 42; 3) a drainage opening 48 in one portion of the main arcuate body member 42; and 4) a cover member 50 mounted across the drainage opening 48.

The cover member 50 comprises a screen member 52 which allows liquid to flow from the main support pan member 14 when draining fluid therefrom while retaining food product within the main support pan member 14.

The main trip lid assembly 18 includes 1) a trip lid housing assembly or lid support ledge or lid support means 54; 2) a lid support and actuator assembly 56 connected to the horizontal section 32 of the fluid overflow section 22 of the main support pan member 14; 3) a lid release adjustment assembly or side wall abutting means or lid brace nipple 58 connected to the trip lid housing assembly 54; 4) an actuator ball assembly obtrusion or protrusion means 60 connected to the trip lid housing assembly 54 positioned diametrically opposite the lid release adjustment assembly 58; and 5) a restraining assembly 62 connected to the actuator ball assembly 60 and releasably connectable to the lid support and actuator assembly 56 in a manner to be explained.

The trip lid housing assembly 54 includes 1) a main arcuate housing body 64 having an outer peripheral and integral actuator rim assembly 66; and 2) a knob member 67 positioned in an upper central portion of an outer surface of the main arcuate housing body 64.

The actuator rim assembly 66 is provided with a projecting support section 68 and an opposed weighted support section 70. The projecting support section 68 is operable to rest on the trip lid support rim portion 30 of the main support pan member 14 as noted in FIG. 5.

The weighted support section 70 and the ball actuator assembly 60 are operable to counter-balance the weight of the projecting support section 68 so that the entire trip lid housing assembly 54 will move to a pressure trip release condition as noted in FIG. 11 for reasons to be explained.

As noted in FIG. 6, the lid support and actuator assembly 56 includes a trip slide member 72 having an adjacent trip stabilizer member 74 which are jointly secured to the flat horizontal section 32 of the main support pan member 14 (FIG. 1).

The trip slide member 72 is provided with a main slide body 76 integral with an anchor section 78 and formed with an arcuate semi-circular ball support section or surface 80. The ball support section 80 curves downwardly and inwardly toward the side wall 28 of the main support pan member 14. A lower edge of the ball support section 80 is aligned with an inner surface of the side wall 28 for proper trip actuated movement of the main trip lid assembly 18 as will be noted.

The trip stabilizer member 74 includes a ball support plate 82 having a semi-circular indentation 84 extended in a generally horizontal plane. The semi-circular indentation 84 is to receive a portion of the actuator ball assembly 60 when placing the main trip lid assembly 18 in an inactive or non-release pressurized condition as will be explained.

As noted in FIG. 11, the lid release adjustment assembly 58 includes a release support member 86 having an adjustment screw member 88 connected thereto. More particularly, the release support member 86 has a threaded hole 90 to receive the adjustment screw member 88 therein which is preferrably a set screw type having an outer hemispherical end section 96 and an upper slot 97 to receive a head of a screwdriver for adjustment thereof.

The hemispherical end section 96 is important and operable to contact an inner surface of the side wall 28 of the main support pan member 14 and provides an infinite adjustment pressure release feature.

As shown in FIG. 6, the actuator ball assembly 60 includes a ball support member 98 anchored to the main trip lid assembly 18 and having an integral ball member 102 positioned on an outer end of the ball support member 98.

The ball member 102 is operable to engage the trip slide member 72 when in a pressure actuated trip release condition during a cooking operation or to be placed within the semi-circular indentation 84 of the trip stabilizer member 74 when in a non-release pressurized condition.

The restraining assembly 62 includes a chain member 104 secured by an anchor clamp 106 to the ball support member 98 and having a ring member 108 connected to an outer end of the chain member 104 (FIG. 6).

The ring member 108 is operable to be releasably mounted about an upper portion of the main slide body 76 of the trip slide member 72 to limit downward pivotal movement of the entire main trip lid assembly 18 as shown in FIG. 11.

In a second embodiment of this invention as shown in FIGS. 8–11 and 13, an overflow cooking pot and adapter assembly 112 is provided with 1) a conventional support pan member 114; 2) a fluid overflow adapter assembly 116 mountable on the conventional support pan member 114; 3) a main trip lid assembly 18 mounted on the fluid overflow adapter assembly 116; and 4) an outer lid assembly 16 mountable on the fluid overflow adapter assembly 116.

The conventional support pan member 114 is provided with a bottom wall 118 having an integral, upright, outwardly inclined side wall 120. The handle assembly 24 connected to the upper edge of the side wall 120. The handle assembly 24 is as previously described having a finger handle member 38 cooperating with the lateral handle member 40 for ease of movement of the conventional support pan member 114.

The fluid overflow adapter assembly 116 includes an overflow rim assembly 122 having an O-ring member or flexible annular support member 124 of various sizes connected thereto. The overflow rim assembly 122 includes an inner tapered wall section 126 integral with a horizontal section 128 that is integral with an upwardly and outwardly extended arcuate wall section 130 which, in turn, has an upper lid support rim section 132 to support the outer lid assembly 16 thereon.

The inner tapered wall section 126 is provided with an outer O-ring groove or flexible annular support member groove 134 and an inner overflow support rim 136 to receive the main trip lid assembly 18 thereon.

The upper lid support rim section 132 is provided with a previously described handle assembly 24 having a finger handle member 38 and a lateral handle member 40 for ease of removal of the fluid overflow adapter assembly 116 from the conventional support pan member 114 as noted in FIG. 13.

The main trip lid assembly 18 is as previously described having 1) the trip lid housing assembly 54; 2) the lid support and actuator assembly 56; secured to the overflow rim assembly 122 3) the lid release adjustment assembly 58; 4) the actuator ball assembly 60; and 5) the restraining assembly 62. These elements are operable in a manner to achieve the pressure release cooking condition as noted in FIGS. 6 and 7 or the optional non-release cooking condition of FIGS. 8 and 9.

The pressure release cooking condition of the main trip lid assembly 18 in the second embodiment of the overflow cooking pot and adapter assembly 112 is as noted in FIG. 10 except the overflow adaptor assembly 116 would be mounted in the conventional support pan member 114 as shown in FIG. 11.

In a third embodiment of this invention, the main trip lid assembly 18 in conjunction with the fluid overflow adapter assembly 116 is utilized on a concave support pan member 142 used in conjunction with a support O-ring member 144, which can be of various sizes, as shown in FIG. 12.

More specifically, the concave support pan member 142 has an arcuate side wall 148 with an upper support rim section 150. The fluid overflow adapter assembly 116 would not properly fit and seal with an upper edge of the arcuate side wall 148 of the concave support pan member 142 without the side of the support O-ring member 144.

As noted in FIG. 12, the support O-ring member 144 has a main ring body 152 with an outer circular surface or diameter 154 of selected various sizes and an inner slot section 156. The inner slot section 156 is operable to be snapped about an outer periphery of the upper support rim section 150 of the concave support pan member 142 (FIG. 12).

Therefore, in this third embodiment, it is obvious that when the fluid overflow adapter assembly 116 is inserted into the concave support pan member 142, an outer surface of the tapered wall section 126 would engage an inner surface of the outer circular surface 154 of the support O-ring member 144 to achieve sealing engagement therewith.

USE AND OPERATION OF THE INVENTION

In the use and operation of the overflow cooking pot assembly 12 of this invention, it is noted that the main support pan member 14 can be filled with a liquid and food product for a cooking operation in an adjustable, pressure cooking situation.

The next step is to place the main trip lid assembly 18 in the position as shown in FIG. 2 with the ball member 102 mounted on the arcuate ball support section 80 of the trip slide member 72 (see FIGS. 6 and 7).

then, on use of the restraining assembly 62, the ring member 108 placed about an upward portion of the main slide body 76 of the trip slide member 72 as shown in FIG. 6.

At this time or prior to placing the main trip lid assembly 18 on the main support pan member 14, the lid release adjustment assembly 58 can be adjusted through the use of a screwdriver to rotate the adjustment screw member 88 axially within the threaded hole 90 of the release support member 86. This adjustment movement of the adjustment screw member 88 operates to increase and decrease contact by the outer hemispherical end section 96 with an inner, upper wall surface of the side wall 28.

If the adjustment screw member 88 is moved downwardly with the threaded hole 90 with a point of contact of the outer hemispherical section 96 with the side wall 28, this would increase the required cooking pressure within the main support pan member 14 to release the main trip lid assembly 18 to a trip lid release condition as shown in FIG. 11. This point of contact is important for the infinite, adjustable pressure release feature of this invention.

On cooking with the combination of liquid and food product within the main support pan member 14, it is noted that, on increasing internal cooking pressure to a predetermined amount, the pressure lifts the adjustment screw 88 disengaging its contact from the side wall 28.

Upon the removal of this support, the weighted support section 70 of the actuator rim assembly 66 pulls the ball member 102 mounted on the projecting support section 68 down the slide surface of the arcuate circular ball support section 80 of the slid member 72 of the lid support and actuator assembly 56. The curvature of the slide surface pries the trip lid housing assembly 54 onto the cooperating horizontal section 32 of the fluid overflow section 22 of the main support pan member 14. This cause the trip lid housing assembly 54 to pivot as noted by an arrow 160 from the lid support rim portion 30 as noted in FIG. 5 to cause an immediate cooling influence on boiling contents in the main support pan member 14.

This upward movement would then achieve the condition of the main trip lid assembly 18 as noted in FIG. 11 with the downward movement thereof indicated by an arrow 162 in FIG. 11 in either the first or second embodiments of the invention. This downward movement is limited due to the length of the chain member 104 on the restraining assembly 62 to prevent the trip lid housing assembly 54 from contacting the food product within the main support pan member 14 being used.

On moving the main trip lid assembly 18 to the aforementioned trip release condition, it is obvious that any pressure build-up in the main support pan member 14 would be harmlessly released to the atmosphere and an immediate cooling influence of cooking contents in the main support pan member 14 is achieved.

It is noted that, after cooking of the food product in the overflow cooking pot assembly 12, the handle assembly 24 on the main support pan member 14 and grasping of the knob member 46 on the outer lid assembly 16 can be utilized for tipping of the entire enclosed structure to drain the fluid contained within the main support pan member 14 outwardly through the drainage opening 48 and through the screen member 52 in the outer lid assembly 16 to act as a strainer for cooking and then subsequent fluid draining function of this invention.

In certain cases, it may be desirable to place the main trip lid assembly 14 in a non-release pressurized or inactive condition. This is illustrated in FIG. 9 whereupon the the ball member 102 of the actuator ball assembly 60 is placed within the semi-circular indentation 84 on the trip stabilizer member 74. In this condition, the main trip lid assembly 18 cannot move to the pivoted pressure release condition of FIG. 11 so as to operate as a conventional lid assembly sealing the interior of the main support pan member 14 for a conventional cooking operation in a non-release pressurized condition.

On use of the second embodiment as noted in FIGS. 10 and 11, the overflow cooking pot and adaptor assembly 112 is similarly operably as previously described for the overflow cooking pot assembly 12. In this second embodiment, the conventional support pan member 114 can be sued, not requiring the specially designed main support pan member 14 in the first embodiment being the overflow cooking pot assembly 12.

More specifically, as noted in FIG. 10, the fluid overflow adapter assembly 116 is positioned over a top opened area of the conventional support pan member 114 and lowered to the position of FIG. 11. On lowering into the conventional support pan member 114, the O-ring member 124 is operable to engage and seal with an inner surface of the side wall 120 of the conventional support pan member 114. O-ring members 124 of various diameters can be selectively used in order to properly seal with the side wall 120 of different internal sizes of conventional support pan members 114.

As noted in FIG. 12 in the third embodiment of this invention, the fluid overflow adapter assembly 116, in conjunction with the main trip lid assembly 18, is utilized with the concave support pan member 142 having the support O-ring member 144 mounted thereon.

When the fluid overflow adapter assembly 116 is lowered into the concave support pan member 142 similar to that shown in FIG. 10, an outer tapered wall section 126 of the overflow rim assembly 122 will contact an inner surface of the support O-ring member 144 to seal therewith. Support O-ring members 144 of various diameters can be selectively used in order to properly seal with the outer tapered wall section 130 of the overflow rim assembly 122.

In this assembled condition of the fluid overflow adapter assembly 116 in conjunction with the main trip lid assembly 18, the third embodiment will then operate in a manner as previously described for the first and second embodiments being operable 1) in an adjustable excess cooking pressure condition within the concave support pan member 142; and 2) in the non-release pressurized condition on interconnection of the actuator ball assembly 60 with the trip stabilizer member 74.

The overflow cooking pot assembly and the embodiment of the overflow cooking pot and adapter assembly of this invention is economical to manufacture; adjustable in operation as to release of a given pressure build-up within a cooking support pan member; easy to use; and substantially maintenance free.

While the invention has been described in conjunction with preferred specific embodiments thereof, it will be understood this description is intended to illustrate and not to limit the scope of the invention, which is defined by the following claims.

We claim:

1. An overflow cooking pot assembly for heating fluids and food products operable to diminish the likelihood of overflow therefrom and release pressure on reaching a preset adjusted pressure condition, comprising:
   a) a main support pan member including a main support section having a fluid overflow section connected to and extended upwardly and laterally of said main support section; and
   b) a main trip lid assembly mounted on said main support section including a trip lid housing assembly, a lid support and actuator assembly secured to said main support pan member, and an actuator assembly mounted on said trip lid housing assembly and engagable with said lid support and actuator assembly for holding said trip lid housing assembly in a pressure trip release condition or a non-release pressurized condition in a position mounted on said main support section of said main support pan member;

whereby said fluid overflow section acts as a cooling area for any overheated fluid and food products to cool same and return to said main support section.

2. An overflow cooking pot assembly as described in claim 1, including:
   a) a lid release adjustment assembly connected to said trip lid housing assembly and engagable with said main support section of said maind support pan member to regulate an amount of pressure created in said main support pan member to cause said main trip lid assembly to pivot to the pressure trip release condition.

3. An overflow cooking pot assembly as described in claim 2, wherein:
   a) said lid release adjustment assembly includes an adjustment screw member having an outer hemispherical end section engagable by a point contact with said main support section to select the amount of pressure within said main support pan member operable to release and pivot said main trip lid assembly.

4. An overflow cooking pot assembly as described in claim 1, wherein:
   a) said main support section having a trip lid support rim portion positioned at a junction of joining of said main support section and said fluid overflow section operable to receive said trip lid housing assembly thereon;
   b) said trip lid housing assembly includes an actuator rim assembly having a projecting support section and a weighted support section;
   c) said projecting support section engagable with said main support section when in a sealed pressure trip release condition and pivotal upwardly on excessive pressure in said main support pan assembly to release subject pressure and allowing overflow therefrom to flow into said fluid overflow section for subsequent cooling.

5. An overflow cooking pot assembly as described in claim 4, wherein:
   a) said weighted support section operates to assist pivotal, pressure release movement of said trip lid housing assembly on release of said actuator assembly from said lid support and actuator assembly.

6. An overflow cooking pot assembly as described in claim 1, wherein:
   a) said actuator assembly includes a ball member;
   b) said lid support and actuator assembly includes a trip slide member to receive said ball member thereon in the pressure trip release condition with said ball member moving out of engagement with said trip slide member on a pressure actuated pivotal movement of said trip lid housing assembly.

7. An overflow cooking pot assembly as described in claim 6, wherein:
   a) said trip slid member having an arcuate, inclined ball support section to receive said ball member thereon;
whereby said ball member moves down and out of contact with said ball support section on pivotal movement of said trip lid housing assembly in response to pressure within said main support pan member.

8. An overflow cooking pot assembly as described in claim 1, wherein:
   a) said main trip lid assembly includes a restraining assembly connected to said actuator assembly and said lid support and actuator assembly to limit pivotal, pressure release movement of said trip lid housing assembly.

9. An overflow cooking pot assembly as described in claim 6, wherein:
   a) an lid support and actuator assembly includes a trip stabilizer member having a ball support plate with a semi-circular indentation to receive said ball member therein to hold said trip lid housing assembly in the non-release pressurized condition.

10. An overflow cooking pot assembly for heating fluids and food products operable to diminish the likelihood of overflow therefrom and automatically release excessive cooking pressure, comprising:
   a) a main support pan member including a main support section having an upwardly inclined side all with an upper lid support rim portion;
   b) a main trip lid assembly including a trip lid housing assembly mounted on said lid support rim portion, a lid support and actuator assembly secured to said lid support rim portion, and an actuator assembly secured to said trip lid housing assembly and releasably engagable with said lid support actuator assembly; and
   c) said trip lid housing assembly pivotal about said lid support rim portion on reaching a certain cooking pressure in said main support pan member to disengage said actuator assembly from said lid support and actuator assembly to completely release all of the cooking pressure in said main support pan member to prevent fluid overflow therefrom.

11. An overflow cooking pot assembly as described in claim 10, wherein:
   a) said main trip lid assembly includes a lid release adjustment assembly connected to said trip lid housing assembly and engagable with said side wall of said main support pan member to regulate the amount of cooking pressure in said main support pan member operable to pivot said trip lid housing assembly to a pressure release position.

12. An overflow cooking pot assembly as described in claim 11, wherein:
   a) said lid release adjustment assembly having an adjustment screw member with an outer hemispherical end section movable against said side wall in a point contact to adjust the pressure at which said trip lid housing assembly pivots to the pressure release condition and said actuator assembly is disengaged from said lid support and actuator assembly.

13. An overflow cooking pot assembly as described in claim 10, wherein:
   a) said trip lid housing assembly includes an actuator rim assembly with a projecting support section and a weighted support section;
   b) a center of said projecting support assembly positioned opposite from said actuator assembly and is supported on said upper lid support rim portion and pivotal thereabout; and
   c) said projecting support assembly extended a peripheral distance greater than 180 degrees about said trip lid housing assembly to permit pivotal movement to a cooking pressure released condition with said weighted support section extended inwardly of said side wall of said main support pan member to aid in the subject pivotal movement.

14. An overflow cooking pot assembly as described in claim 10, wherein:
   a) said main support pan member includes a flat horizontal section to support said main trip lid assembly thereon; and
   b) said flat horizontal section having an inner diameter less than an outer diameter of said lid support rim portion;
whereby said trip lid housing assembly is pivotal about said lid support rim portion on reaching a certain cooking pressure in said main support pan member.

15. An overflow cooking assembly usable with a conventional support pan member in order to heat fluids therewith for cooking food products; operable to diminish the likelihood of overflow of the cooking fluid therefrom; and operable to automatically release excessive cooking pressure created in the support pan member, comprising:
  a) a support pan member including a main support section having a bottom wall connected to an upright side wall;
  b) a fluid overflow adapter assembly releasable mounted in said support pan member in sealing engagement with said upright side wall and having an arcuate wall section extended upwardly from a tapered wall section to receive overflow fluids therein;
  c) a main trip lid assembly mounted within said fluid overflow adapter assembly; and
  d) said main trip lid assembly includes a trip lid housing assembly; an actuator assembly mounted on said trip lid housing assembly; a lid support and actuator assembly mounted on said overflow rim assembly and releasably engagable with said actuator assembly to hold said trip lid housing assembly in a sealed engagement with said overflow rim assembly;
whereby excessive cooking pressure in said support pan member causes said trip lid housing assembly to pivot about said overflow rim assembly and immediately release excessive cooking pressure from said support pan member.

16. An overflow cooking pot assembly as described in claim 15, wherein:
  a) said main trip lid assembly includes a restraining assembly connected to said actuator assembly and said lid support and actuator assembly to limit pivotal movement of said trip lid assembly to the cooking pressure release condition.

17. An overflow cooking pot assembly as described in claim 15, including:
  a) an outer lid assembly mounted on an upper support rim section of said overflow rim assembly; and
  b) said outer lid assembly having an opening covered by a screen member to permit drainage of fluid from said support pan member while retaining food products therein.

18. An overflow cooking pot assembly as described in claim 15, wherein:
  a) said fluid overflow adapter assembly includes a flexible annular support member member connected to said overflow rim assembly and engagable with said upright said wall of said support pan member to form a seal therewith.

19. An overflow cooking pot assembly as described in claim 18, wherein:
  a) said flexible annular support member is an O-ring member of various diameters and selected of a certain size to form the proper seal with said upright side wall of said support pan member.

20. An overflow cooking pot assembly as described in claim 15, wherein:
  a) said main trip lid assembly includes a lid release adjustment assembly connected to said trip lid housing assembly and engagable with said arcuate tapered wall section to regulate the amount of cooking pressure in said main support pan member operable to pivot said trip lid housing assembly to a pressure release position.

21. An overflow cooking pot assembly as described in claim 20, wherein:
  a) said lid release adjustment assembly having an adjustment screw member with an outer hemispherical end section movable against said side wall in a point of contact to adjust the pressure at which said trip lid housing assembly pivots to the pressure release condition and said actuator assembly is disengaged from said lid support and actuator assembly.

22. An overflow cooking pot assembly usable with a conventional concave support pan member, comprising:
  a) a support pan member with an outwardly concave side wall with a peripheral upper support rim section;
  b) a flexible annular support member connected to said upper support rim section;
  c) a fluid overflow adapter assembly including an overflow rim assembly with an inner tapered wall section mounted within said concave side wall of said support pan member to form a pressure seal against said flexible annular support member; and
  d) a main trip lid assembly mounted in said overflow rim assembly having a trip lid housing assembly to automatically pivot about said overflow rim assembly on reaching an excessive cooking pressure in said support pan member to immediately release subject cooking pressure therefrom.

23. An overflow cooking pot assembly as described in claim 22, wherein:
  a) said flexible annular support member is a support O-ring member of various diameters and selected of a certain size to form the pressure seal with said tapered wall section.

24. An overflow cooking pot assembly as described in claim 22, wherein:
  a) said main trip lid assembly mounted on said main support section including a trip lid housing assembly, a lid support and actuator assembly secured to said main support pan member, and an actuator assembly mounted on said trip lid housing assembly and engagable with said lid support and actuator assembly for holding said trip lid housing assembly in a pressure trip release condition or a non-release pressurized condition in a position mounted on said main support section of said main support pan member.

25. An overflow cooking pot assembly as described in claim 24, wherein:
  a) said trip lid housing assembly includes an actuator rim assembly having a projecting support section and a weighted support section;
  b) said projecting support section mounted against said upper support rim section when in a sealed pressure trip release condition and pivotal upwardly on excessive pressure in said support pan member to release subject pressure and allowing overflow therefrom to flow into said overflow rim assembly for subsequent cooling and restricting overflow therefrom; and
  c) said weighted support section operates to assist pivotal, pressure release movement of said trip lid housing assembly on release of said actuator assembly from said lid support and actuator assembly.

26. An overflow cooking pot assembly as described in claim 24, wherein:
  a) said actuator assembly includes a ball member;
  b) said lid support and actuator assembly includes a trip slide member to releasably receive said ball member therein in the pressure trip release condition with said ball member moving out of engagement with said trip slide member in the pressure actuated pivotal movement of said trip lid housing assembly.

27. An overflow cooking pot assembly as described in claim 22, wherein:
   a) said main trip lid assembly includes a lid release adjustment assembly connected to said trip lid housing assembly and engagable with said tapered wall section to regulate the amount of cooking pressure in said main support pan member operable to pivot said trip lid housing assembly to a pressure release position.

28. An overflow cooking pot assembly as described in claim 27, wherein:
   a) said lid release adjustment assembly having an adjustment screw member with an outer hemispherical end section movable against said side wall in a point contact to adjust the pressure at which said trip lid housing assembly pivots to the pressure release condition and said actuator assembly is disengaged from said lid support and actuator assembly.

29. An overflow cooking pot assembly for heating fluids and food products operable to diminish the likelihood of overflow therefrom and automatically release excessive cooking pressure, comprising:
   a) a main support pan member including a main support section having a fluid overflow section connected to and extended upwardly and laterally of an upper lid support rim portion of said main support section;
   b) a main trip lid assembly including a trip lid housing assembly mounted on said lid support rim portion, a lid support means secured to said lid support rim portion, and a protrusion means secured to said trip lid housing assembly and releasably engagable with said lid support means; and
   c) said trip lid housing assembly pivotal about said lid support rim portion on reaching a certain cooking pressure in said main support pan member to disengage said protrusion means from said lid support means to completely release all of the cooking pressure in said main support pan member to prevent fluid overflow therefrom;
whereby said fluid overflow section acts as a cooking area for any overheated fluid and food products to cool same and return to said main support section.

30. An overflow cooking pot assembly as described in claim 29, wherein:
   a) said main support section having an upwardly inclined side wall; and
   b) said main trip lid assembly includes a side wall abutting means connected to said trip lid housing assembly and engagable with said side wall of said main support pan member to properly position said main trip lid assembly on said main support pan member operable to cause pivoting of said trip lid housing assembly to a pressure release position.

31. An overflow cooking pot assembly as described in claim 29, wherein:
   a) said trip lid housing assembly includes an actuator rim assembly with a projecting support section and a weighted support section; and
   b) a center of said projecting support assembly positioned opposite from said lid support means and support on said upper lid support rim portion and pivotal thereabout.

32. An overflow cooking pot assembly as described in claim 31, wherein:
   a) said projecting support assembly extended a peripheral distance greater than 180 degrees about said trip lid housing assembly to permit pivotal movement to a cooking pressure released condition with said weighted support section extended inwardly of an upwardly inclined side wall of said main support pan member to aid in the subject pivotal movement.

* * * * *

UNITED STATES PATENT AND TRADEMARK OFFICE
CERTIFICATE OF CORRECTION

PATENT NO. : 5,193,524
DATED : March 16, 1993
INVENTOR(S) : DENNIS G. LOYD and LOIS B. LOYD It is certified that error appears in the above-identified patent and that said Letters Patent is hereby corrected as shown below:

Column 5, lines 3 and 4, delete "convention" and insert therefore...conventional...;

Column 9, line 57, delete "sued" and insert therefore... used...;

Column 10:
Claim 2, line 5, delete "maind" and insert therefore... main...;

Column 12:
Claim 10, line 6, delete "all" and insert therefore... wall...;

Column 13:
Claim 15, line 11, delete "releasable" and insert therefore...releasably...;

Column 13:
Claim 18, line 6, delete "said" (second occurrence) and insert therefore...side....

Signed and Sealed this

Eighth Day of February, 1994

Attest:

BRUCE LEHMAN

*Attesting Officer*     *Commissioner of Patents and Trademarks*